United States Patent
Ootani et al.

(10) Patent No.: US 6,168,648 B1
(45) Date of Patent: Jan. 2, 2001

(54) SPIRAL WOUND TYPE MEMBRANE MODULE, SPIRAL WOUND TYPE MEMBRANE ELEMENT AND RUNNING METHOD THEREOF

(75) Inventors: Akira Ootani; Hideki Hayama; Yoshihiko Kondou, all of Osaka (JP)

(73) Assignee: Nitto Denko Corporation, Osaka (JP)

( * ) Notice: Under 35 U.S.C. 154(b), the term of this patent shall be extended for 0 days.

(21) Appl. No.: 09/382,937

(22) Filed: Aug. 25, 1999

Related U.S. Application Data

(63) Continuation of application No. PCT/JP98/05835, filed on Dec. 21, 1998.

(30) Foreign Application Priority Data

Dec. 25, 1997 (JP) .................................................... 9-356794

(51) Int. Cl.$^7$ ................................................. B01D 53/22
(52) U.S. Cl. .............................. 95/46; 95/45; 96/6; 96/7; 96/13; 210/321.76; 210/321.85
(58) Field of Search ................ 95/44–46; 96/4, 96/6, 7, 11–14; 210/321.74, 321.76, 321.81, 321.83, 321.85, 321.9

(56) References Cited

U.S. PATENT DOCUMENTS

| | | | |
|---|---|---|---|
| 3,668,837 | * 6/1972 | Gross | 96/6 |
| 4,083,780 | * 4/1978 | Call | 210/321.74 X |
| 4,855,058 | * 8/1989 | Holland et al. | 210/321.74 X |
| 5,061,297 | * 10/1991 | Krasberg | 96/4 X |
| 5,100,555 | * 3/1992 | Matson | 96/6 X |
| 5,147,541 | * 9/1992 | McDermott, Jr. et al. | 210/321.74 |
| 5,149,340 | * 9/1992 | Waycuilis | 96/11 X |
| 5,154,832 | * 10/1992 | Yamamura et al. | 210/321.74 X |
| 5,266,195 | * 11/1993 | Hopkins | 210/321.74 |
| 5,458,774 | * 10/1995 | Mannapperuma | 210/321.83 |
| 5,580,452 | * 12/1996 | Lin | 210/321.74 |
| 5,753,009 | * 5/1998 | Sirkar et al. | 95/45 |
| 5,897,779 | * 4/1999 | Wisted et al. | 210/321.74 X |
| 5,928,409 | * 7/1999 | Sirkar | 95/45 |

FOREIGN PATENT DOCUMENTS

| | | |
|---|---|---|
| 58-159806 | 9/1983 | (JP) . |
| 4-193321 | 7/1992 | (JP) . |
| 7-9430 | 2/1995 | (JP) . |
| 7-213880 | 8/1995 | (JP) . |

* cited by examiner

Primary Examiner—Robert H. Spitzer
(74) Attorney, Agent, or Firm—Akin, Gump, Strauss, Hauer & Feld, L.L.P.

(57) ABSTRACT

A spiral wound type membrane element is formed by superposing gas-liquid contact membranes on both surfaces of a first fluid passage forming member, superposing a second fluid passage forming member on the surface of one of the gas-liquid contact membranes and spirally winding the gas-liquid contact membranes around a second fluid supply pipe along with the first fluid passage forming member and the second fluid passage forming member. A side portion on the inner peripheral side and a side portion on the outer peripheral side of a first fluid passage formed by the first fluid passage forming member between the gas-liquid contact membranes are sealed. Both end portions of a second fluid passage formed by the second fluid passage forming member between the gas-liquid contact membranes are sealed. The spiral wound type membrane element is stored inside a cylindrical container. The gas-liquid contact membranes are formed by PTFE (polytetrafluoroethylene) porous membranes having hydrophobicity. First fluid is supplied from a first fluid inlet of the cylindrical container, passes through the first fluid passage of the spiral wound type membrane element and is taken outward from a first fluid outlet of the cylindrical container. Second fluid is supplied into the second fluid supply pipe from a second fluid inlet of the cylindrical container, passes through the second fluid passage of the spiral wound type membrane element and is taken outward from a second fluid outlet of the cylindrical container.

21 Claims, 3 Drawing Sheets

SPIRAL WOUND TYPE MEMBRANE MODULE, SPIRAL WOUND TYPE MEMBRANE ELEMENT AND RUNNING METHOD THEREOF

CROSS REFERENCE TO RELATED APPLICATION

This application is a continuation of International Application PCT/JP98/05835, filed Dec. 21, 1998, the disclosure of which is incorporated herein by reference.

BACKGROUND OF THE INVENTION

1. Field of the Invention

The present invention relates to a spiral wound type membrane module employed for a gas-liquid contact operation such as gas dissolution in liquid or gas discharge from liquid, a spiral wound type membrane element used for the spiral wound type membrane module and a running method thereof.

2. Description of the Background Art

Generally in many fields of the chemical industry and the like, a gas-liquid contact operation such as gas dissolution in liquid or gas discharge from liquid is performed. For example, oxygen supply to a microbial culture solution in the drug field or the like, ozone dissolution in an ultrapure water line in the electronic industry, oxygen supply to pisciculture in the marine products industry, or flue gas treatment of $NO_x$ (nitrogen oxide) or $SO_x$ (sulfur oxide) can be listed as gas dissolution, and decarbonization treatment in pure water preparation can be listed as gas discharge.

For the mode of a membrane module used for a gas-liquid contact method employing a membrane, a hollow fiber type is frequently employed in general due to the highness of charging efficiency. In a membrane module of the hollow fiber type, a use method of feeding liquid into a hollow fiber membrane and feeding gas outside the hollow fiber membrane is generally carried out.

In order to efficiently make mass transfer between gas and liquid in the gas-liquid contact method, it is necessary to reduce laminar film resistance on the liquid side. Therefore, a method of increasing the flow rate of the liquid and suppressing the laminar film resistance is generally carried out.

When the inside of the hollow fiber membrane of the hollow fiber membrane module is employed as a liquid passage, however, the flow state of the liquid forms laminar flow, the flow rate of the liquid lowers and the laminar film resistance rises. When liquid of a high flow rate is to be fed to the inside of the hollow fiber membrane in order to suppress the laminar film resistance, pressure loss in another liquid passage of the hollow fiber membrane module rises. Consequently, high energy is required in order to make the liquid flow in the hollow fiber membrane module, leading to poor economy.

In this regard, a hollow fiber membrane module employing the outside of a hollow fiber membrane as a liquid passage is developed in order to suppress laminar film resistance and increase an effective membrane area. This hollow fiber membrane module is so devised as to make the flow state of liquid flowing outside the hollow fiber membrane turbulent for suppressing laminar film resistance.

However, such a hollow fiber membrane module has such problems that the structure is complicated and the manufacturing cost increases. If the outside of the hollow fiber membrane is employed as a liquid passage, further, the amount of fine grains resulting from various members forming the hollow fiber membrane module increases as compared with the case of employing the inside of the hollow fiber membrane as the liquid passage, and the quality of treated water thus lowers.

SUMMARY OF THE INVENTION

An object of the present invention is to provide a spiral wound type membrane module suppressing increase of laminar film resistance for enabling an efficient gas-liquid contact operation.

Another object of the present invention is to provide a spiral wound type membrane element suppressing increase of laminar film resistance for enabling an efficient gas-liquid contact operation and a running method thereof.

A spiral wound type membrane module according to the present invention comprises a spiral wound type membrane element including a perforated hollow pipe and one or a plurality of pairs of continuous or independent permeation membranes spirally wound on the outer peripheral surface of the perforated hollow pipe while holding a first passage forming member inside and superposing a second passage forming member outside, and a cylindrical container accommodating the spiral wound type membrane element and having first fluid ports on both end portions respectively while having second fluid ports on at least one end portion and the outer peripheral portion respectively, a first passage is formed by the first passage forming member between the permeation membranes, a second passage is formed by the second passage forming member between the permeation membranes, a side portion on the inner peripheral side and a side portion on the outer peripheral side of the first passage are sealed while both end portions of the second passage are sealed, first spaces are formed in the cylindrical container on both end portions of the spiral wound type membrane element respectively, a second space is formed in the cylindrical container on the outer peripheral side of the spiral wound type membrane element, the first spaces and the second space are separated, the first spaces communicate with the first fluid ports, the second space communicates with the second fluid port on the outer peripheral portion of the cylindrical container, and the inner part of the perforated hollow pipe communicates with the second fluid port on at least one end portion of the cylindrical container.

In the spiral wound type membrane module according to the present invention, first fluid is supplied into one first space from the first fluid port on one end portion of the cylindrical container, passes through the first passage formed between the permeation membranes of the spiral wound type membrane element and flows into the other first space, and is derived outward from the first fluid port on the other end portion of the cylindrical container. Second fluid is supplied inward into the perforated hollow pipe from the second fluid port on at least one end portion of the cylindrical container, passes through the second passage formed between the permeation membranes of the spiral wound type membrane element and flows into the second space in the cylindrical container, and is derived outward from the second fluid port formed on the outer peripheral portion of the cylindrical container.

Inside the cylindrical container, the first fluid flows substantially in parallel with the perforated hollow pipe, and the second fluid spirally flows in a direction substantially perpendicular to the first fluid through the permeation membranes. The first fluid and the second fluid come into contact with each other through the permeation membranes, and permeation of a target component is performed. Due to such structures of the first passage and the second passage, the flow state of the first fluid or the second fluid can be brought into a turbulent state for reducing laminar film resistance on the surfaces of the permeation membranes. Thus, permeation of the target component can be efficiently performed between the first fluid and the second fluid.

In the cylindrical container, the passage region of the first fluid and the passage region of the second fluid are prevented from occurrence of stay. Thus, treatment of the fluid can be performed regularly in a clean state.

The fluid passing through the first passage may be gas, and the fluid passing through the second passage may be liquid. In this case, the gas is supplied into one first space from the first fluid port on one end portion of the cylindrical container, passes through the first passage formed between the permeation membranes of the spiral wound type membrane element and flows into the other first space, and is derived outward from the first fluid port on the other end portion of the cylindrical container. The liquid is supplied inward into the perforated hollow pipe from the second fluid port on at least one end portion of the cylindrical container, passes through the second passage formed between the permeation membranes of the spiral wound type membrane element and flows into the second space in the cylindrical container, and is derived outward from the second fluid port formed on the outer peripheral portion of the cylindrical container.

The fluid passing through the first passage may be liquid, and the fluid passing through the second passage may be gas. In this case, the liquid is supplied into one first space from the first fluid port on one end portion of the cylindrical container, passes through the first passage formed between the permeation membranes of the spiral wound type membrane element and flows into the other first space, and is derived outward from the first fluid port on the other end portion of the cylindrical container. The gas is supplied inward into the perforated hollow pipe from the second fluid port on at least one end portion of the cylindrical container, passes through the second passage formed between the permeation membranes of the spiral wound type membrane element and flows into the second space in the cylindrical container, and is derived outward from the second fluid port formed on the outer peripheral portion of the cylindrical container.

In the aforementioned spiral wound type membrane module, further, the permeation membrane is preferably a simple substance membrane or a composite membrane formed by one or a plurality of membranes selected from a porous membrane, a microporous membrane and a nonporous membrane. In addition, it is preferable that the permeation membrane has a skin layer or dense layer on the membrane surface and the permeation membrane is so arranged that the skin layer or dense layer is on the side of the passage for the liquid. Thus, the liquid is prevented from penetrating into pores inside the permeation membrane or the liquid is prevented from passing through the permeation membrane, and the gas-liquid contact operation can be efficiently and reliably performed.

The permeation membrane may be a hydrophobic permeation membrane. In this case, the permeation membrane has hydrophobicity and hence the surface of the permeation membrane is prevented from hydrophilization even if liquid containing a solvent is introduced. Thus, the surface of the permeation membrane coming into contact with the liquid maintains hydrophobicity, whereby gas dissolution efficiency or degassing efficiency is prevented from reduction.

The hydrophobic permeation membrane may be made of fluororesin. In particular, it is preferable that the fluororesin is polytetrafluoroethylene. Fluororesin, particularly polytetrafluoroethylene has high hydrophobicity. Even if liquid containing a solvent hydrophilizing the surface of the permeation membrane is introduced, therefore, it is possible to maintain hydrophobicity on the permeation membrane surface coming into contact with the liquid thereby preventing reduction of gas dissolution efficiency or degassing efficiency.

Further, it is preferable that the hydrophobic permeation membrane is a porous membrane. In this case, an adhesive interposed between bonded portions of one or a plurality of pairs of permeation membranes readily impregnates the porous membranes, and the bonding strength of the permeation membranes can be improved.

In addition, a side portion on the inner peripheral side and a side portion on the outer peripheral side of the first passage or both end portions of the second passage may be sealed by heating and melting fluororesin having a melting point lower than the melting point of the permeation membrane. In this case, the sealed portions are sealed with fluororesin having high viscosity, whereby the closeness of each sealed portion of the first passage and the second passage can be improved. Further, the melting point of the fluororesin is lower than the melting point of the permeation membrane, whereby the permeation membranes can be readily bonded by heating and melting the fluororesin without dissolving the permeation membranes.

A spiral wound type membrane element according to another aspect of the present invention comprises a hollow cylindrical pipe and one or a plurality of pairs of continuous or independent permeation membranes spirally wound on the outer peripheral surface of the perforated hollow pipe while holding a first passage forming member inside and superposing a second passage forming member outside, a first passage is formed by the first passage forming member between the permeation membranes, a second passage is formed by the second passage forming member between the permeation membranes, and a side portion on the inner peripheral side and a side portion on the outer peripheral side of the first passage are sealed while both end portions of the second passage are sealed.

In this spiral wound type membrane element, first fluid is supplied into the first passage formed between the permeation membranes from one end portion of the spiral wound type membrane element, and derived from the other end portion of the spiral wound type membrane element. Second fluid is supplied inward into the perforated hollow pipe from at least one end portion of the perforated hollow pipe, passes through the second passage formed between the permeation membranes and is derived from the outer peripheral portion of the spiral wound type membrane element.

The first fluid flows in the first passage substantially in parallel with the perforated hollow pipe, and the second fluid spirally flows in the second passage in a direction substantially perpendicular to the first fluid. The first fluid and the second fluid come into contact with each other through the permeation membranes, and permeation of a target component is performed. Due to such structures of the first passage and the second passage, laminar film resistance on the permeation membrane surfaces can be reduced by bringing the flow state of the first fluid or the second fluid into a turbulent state. When employing this spiral wound type membrane element, therefore, permeation of the target component can be efficiently performed between the first fluid and the second fluid.

The fluid passing through the first passage may be gas, and the fluid passing through the second passage may be liquid. In this case, the gas is supplied into the first passage from one end portion of the spiral wound type membrane element, and is derived from the other end portion of the spiral wound type membrane element. The liquid is supplied inward into the perforated hollow pipe from at least one end portion of the perforated hollow pipe, passes through the second passage and is derived from the outer peripheral portion of the spiral wound type membrane element.

The fluid passing through the first passage may be liquid, and the fluid passing through the second passage may be gas. In this case, the liquid is supplied into the first passage from one end portion of the spiral wound type membrane element, and is derived from the other end portion of the spiral wound type membrane element. The gas is supplied inward into the perforated hollow pipe from at least one end portion of the hollow cylindrical pipe, passes through the second passage and is derived from the outer peripheral portion of the spiral wound type membrane element.

In this spiral wound type membrane element, further, the permeation membrane is preferably a simple substance membrane or a composite membrane formed by one or a plurality of membranes selected from a porous membrane, a microporous membrane and a non-porous membrane. In addition, it is preferable that the permeation membrane has a skin layer or dense layer on the membrane surface and the permeation membrane is so arranged that the skin layer or dense layer is on the side of the passage for the liquid. Thus, the liquid is prevented from penetrating into pores inside the permeation membrane or the liquid is prevented from passing through the permeation membrane, and the gas-liquid contact operation can be efficiently and reliably performed.

The permeation membrane may be a hydrophobic permeation membrane. In this case, the permeation membrane has hydrophobicity and hence the surface of the permeation membrane is prevented from hydrophilization even if liquid containing a solvent is introduced. Thus, the surface of the permeation membrane coming into contact with the liquid maintains hydrophobicity, whereby gas dissolution efficiency or degassing efficiency is prevented from reduction.

The hydrophobic permeation membrane may be made of fluororesin. In particular, it is preferable that the fluororesin is polytetrafluoroethylene. Fluororesin, particularly polytetrafluoroethylene has high hydrophobicity. Even if liquid containing a solvent hydrophilizing the surface of the permeation membrane is introduced, therefore, it is possible to maintain hydrophobicity on the permeation membrane surface coming into contact with the liquid thereby preventing reduction of gas dissolution efficiency or degassing efficiency.

Further, it is preferable that the hydrophobic permeation membrane is a porous membrane. In this case, an adhesive interposed between bonded portions of one or a plurality of pairs of permeation membranes readily impregnates the porous membranes, and the bonding strength of the permeation membranes can be improved.

In addition, a side portion on the inner peripheral side and a side portion on the outer peripheral side of the first passage or both end portions of the second passage may be sealed by heating and melting fluororesin having a melting point lower than the melting point of the permeation membrane. In this case, the sealed portions are sealed with fluororesin having high viscosity, whereby the closeness of each sealed portion of the first passage and the second passage can be improved. Further, the melting point of the fluororesin is lower than the melting point of the permeation membrane, whereby the permeation membranes can be readily bonded by heating and melting the fluororesin without dissolving the permeation membranes.

According to still another aspect of the present invention, a running method of a spiral wound type membrane element comprising a perforated hollow pipe and one or a plurality of pairs of continuous or independent permeation membranes spirally wound on the outer peripheral surface of the perforated hollow pipe while holding a first passage forming member inside and superposing a second passage forming member outside in which a first passage is formed by the first passage forming member between the permeation membranes and a second passage is formed by the second passage forming member between the permeation membranes, comprises steps of supplying first fluid into the first passage from one end portion of the spiral wound type membrane element while deriving the first fluid from another end portion of the spiral wound type membrane element, and supplying second fluid into the second passage from at least one end portion of the perforated hollow pipe through the inner part of the perforated hollow pipe while deriving the second fluid from the outer peripheral portion of the spiral wound type membrane element.

According to this running method of a spiral wound type membrane element, permeation of a target component can be efficiently performed between the first fluid and the second fluid.

The first fluid may be gas, and the second fluid may be liquid. Alternatively, the first fluid may be liquid, and the second fluid may be gas. Thus, a gas-liquid contact operation can be efficiently performed.

DESCRIPTION OF THE PREFERRED EMBODIMENTS

First Embodiment

Figure 1:
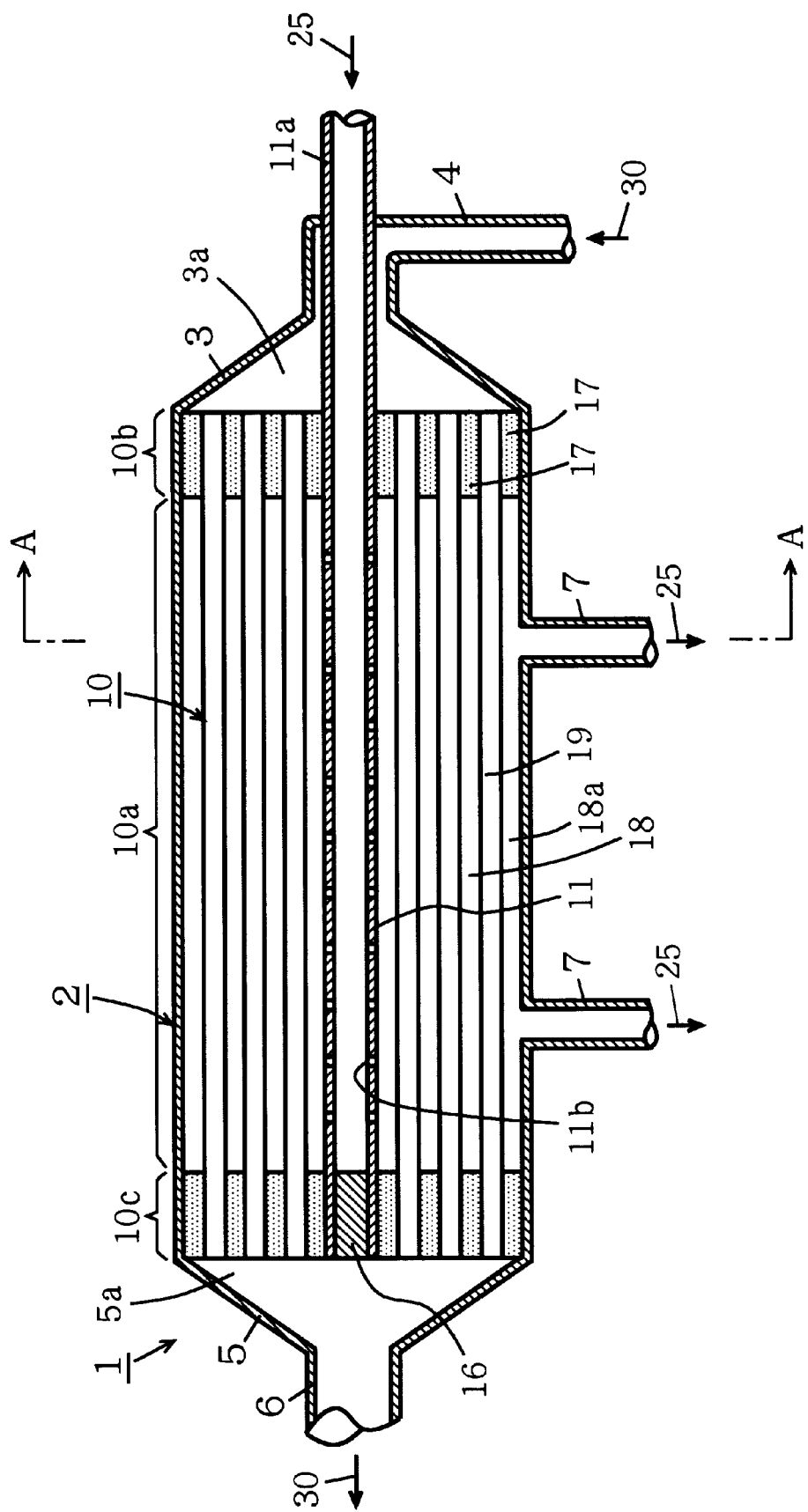
FIG. 1 is a sectional view showing an embodiment of a spiral wound type membrane module according to the present invention.
Figure 2:
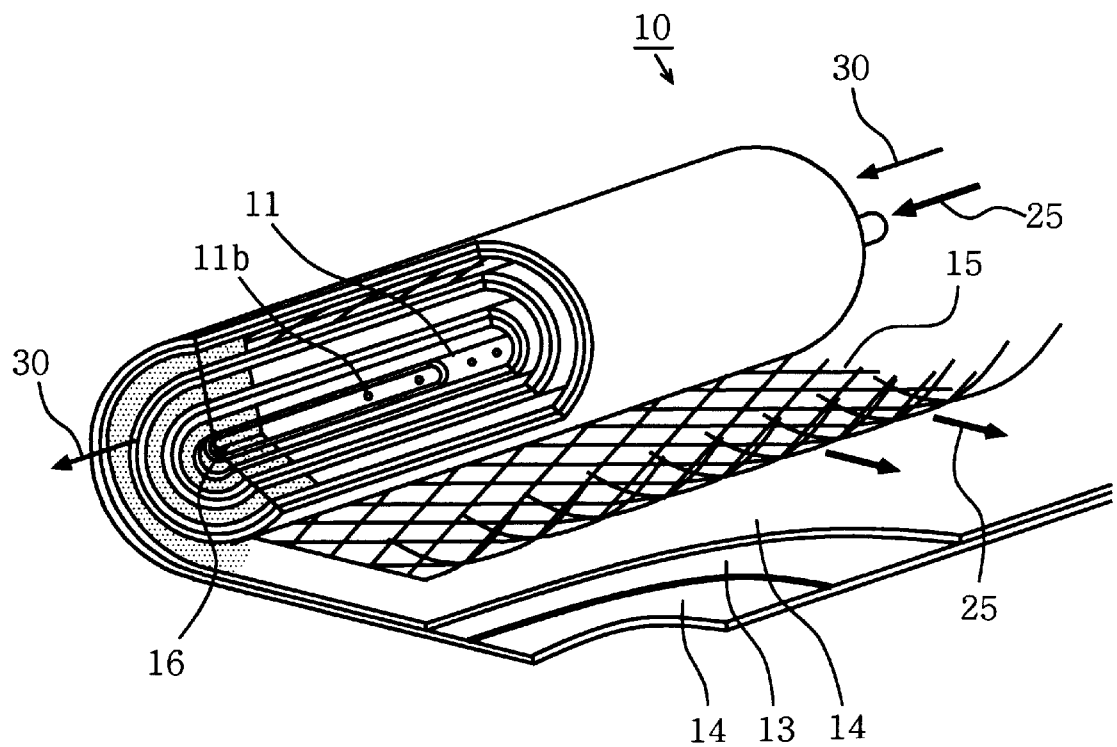
FIG. 2 is a partially fragmented perspective view of a membrane element of the spiral wound type membrane module of FIG. 1.

A first embodiment of the spiral wound type membrane module according to the present invention is now described with reference to the drawings. FIG. 1 is a sectional view of the spiral wound type membrane module, and FIG. 2 is a partially fragmented perspective view of a membrane element of the spiral wound type membrane module of FIG. 1. Further, FIG. 3 is an A—A line sectional view in FIG. 1.

Figure 3:
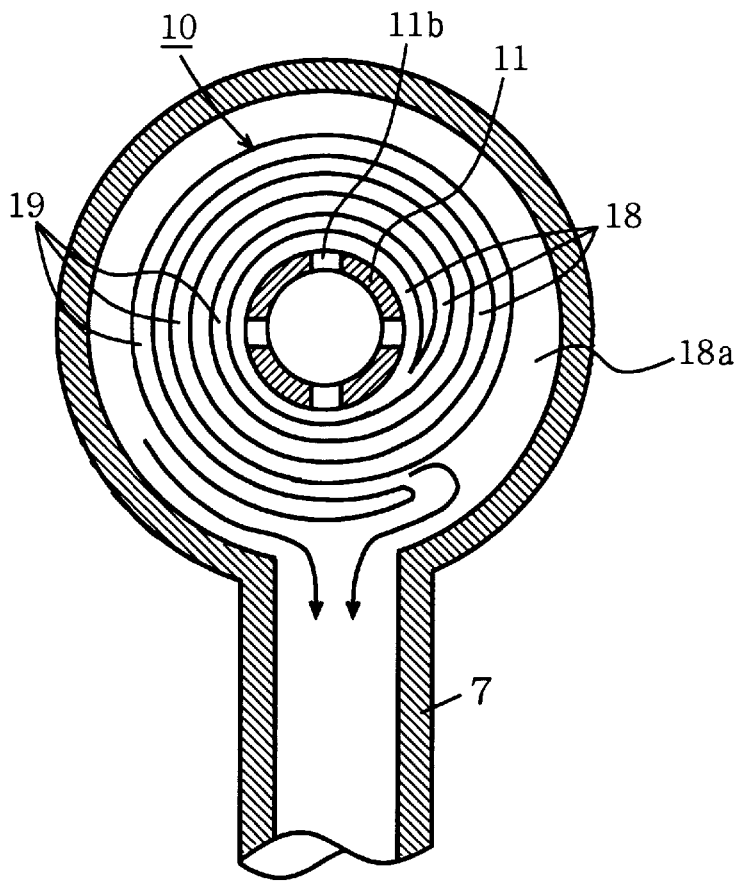
FIG. 3 is an A—A line sectional view in FIG. 1.

The spiral wound type membrane module 1 shown in FIG. 1 to FIG. 3 comprises a cylindrical container 2 and a spiral wound type membrane element 10 inserted inward into the cylindrical container 2. The cylindrical container 2 has a cylindrical body part, and a first fluid inlet 4 is formed on one end portion 3 of the body part while a first fluid outlet 6 is formed on another end portion 5. A second fluid outlet 7 is formed on the body part of the cylindrical container 2 on one or a plurality of portions.

Referring to FIG. 2, the spiral wound type membrane element 10 is formed by superposing gas-liquid contact membranes 14 on both surfaces of a first fluid passage forming member (first fluid spacer) 13, superposing a second fluid passage forming member (second fluid spacer) 15 on the surface of one of the gas-liquid contact membranes 14 and spirally winding the gas-liquid contact membranes 14 around a second fluid supply pipe (perforated hollow pipe) 11 along with the first fluid passage forming member 13 and the second fluid passage forming member 15. Side portions (sides parallel to the second fluid supply pipe 11) on the inner peripheral sides and side portions on the outer peripheral sides of the gas-liquid contact membranes 14 on both surfaces of the spirally wound first fluid passage forming member 13 are bonded or sealed.

An end of the second fluid supply pipe 11 passes through one end portion 3 of the cylindrical container 2 and forms a second fluid inlet 11a, and another end is sealed with a resin agent 16. A plurality of supply holes 11b are formed on the pipe wall of the second fluid supply pipe 11, so that pressure loss can be suppressed low with respect to the flow rate of supplied fluid. Slits may be provided in place of the supply holes 11b.

The spiral wound type membrane element 10 is formed by a gas-liquid contact portion 10a where gas and liquid come into contact with each other through the gas-liquid contact membranes 14 and sealed portions 10b and 10c located on both ends thereof. In the gas-liquid contact portion 10a, a spiral space in which the second fluid passage forming member 15 is inserted forms a second fluid passage (second passage) 18. The second fluid passage 18 spirally extends from the supply holes 11b of the second fluid supply pipe 11 around the second fluid supply pipe 11, reaches a space (second space) 18a between the inner wall of the cylindrical container 2 and the outer peripheral surface of the spiral wound type membrane element 10, and communicates with the second fluid outlet 7. In the gas-liquid contact portion 10a, a spiral space in which the first fluid passage forming member 13 is inserted forms a first fluid passage (first passage) 19.

Figure 4:
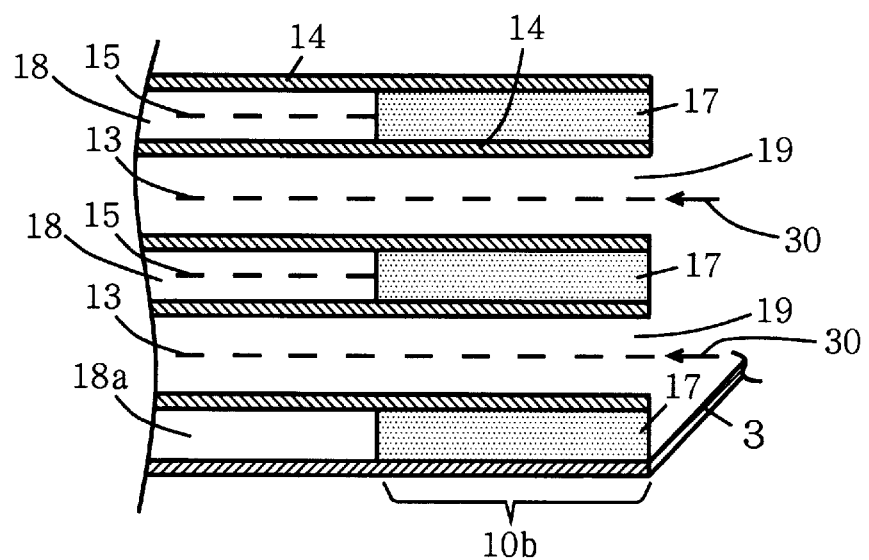
FIG. 4 is an enlarged sectional view of sealed portions of the spiral wound type membrane element in FIG. 1.

FIG. 4 is an enlarged sectional view of the sealed portions of the spiral wound type membrane element in FIG. 1. In the sealed portions 10b and 10c, both end portions of the second fluid passage 18 formed between the gas-liquid contact membranes 14 holding the second fluid passage forming member 15 and both end portions of the space 18a inside the cylindrical container 2 are sealed with a resin agent 17. Both end portions of the first fluid passage 19 formed between the gas-liquid contact membranes 14 holding the first fluid passage forming member 13 are opened.

Due to the aforementioned structure, first fluid 30 flows into an inlet space (first space) 3a on one end portion 3 of the cylindrical container 2 from the first fluid inlet 4, passes through the first fluid passage 19 opened on the end surfaces of the spiral wound type membrane element 10 and flows into an outlet space (first space) 5a on the other end portion 5 of the cylindrical container 2, and is derived outward from the first fluid outlet 6.

Second fluid 25 is supplied inward into the second fluid supply pipe 11 from the second fluid inlet 11a, passes through the second fluid passage 18 formed between the gas-liquid contact membranes 14 from the supply holes 11b on the pipe wall of the second fluid supply pipe 11 and spirally flows in a direction perpendicular to the second fluid supply pipe 11, and is derived outward from the second fluid outlet 7 of the cylindrical container 2. The flow of the second fluid in the second fluid passage 18 can be homogenized by providing the second fluid outlet 7 in plural.

In the gas-liquid contact portion 10a of the spiral wound type membrane element 10, the second fluid spirally flowing in the direction substantially perpendicular to the second fluid supply pipe 11 and the first fluid flowing in parallel with the second fluid supply pipe 11 come into contact with each other through the gas-liquid contact membranes 14. Thus, a target component of the first fluid is permeated to the second fluid side, and a target component of the second fluid is permeated to the first fluid side.

The spiral wound type membrane module according to this embodiment is preferably employed for gas dissolution or gas discharge by a gas-liquid contact method. In this regard, hydrophobic porous membranes or microporous membranes or hydrophobic non-porous membranes, or composite membranes formed by a plurality of membranes among porous membranes, microporous membranes and non-porous membranes is employed as the gas-liquid contact membranes 14.

In order to improve the strength, supports of nonwoven fabric or the like may be stuck or welded to single surfaces of the gas-liquid contact membranes 14 in the form of flat membranes. When employing such supports, it is preferable to stick or weld the supports to the surfaces coming into contact with gas having smaller mass transfer resistance as compared with liquid.

When the gas-liquid contact membranes 14 are asymmetrical membranes having dense layers or skin layers on the surfaces, the spiral wound type membrane element 10 is preferably so formed that the surfaces opposite to the dense layers or skin layers come into contact with gas having small mass transfer resistance and the surfaces formed with the dense layers or skin layers come into contact with liquid, from a standpoint similar to the above.

As the gas-liquid contact membranes 14, membranes made of polyolefin such as polyethylene or polypropylene, fluororesin such as polyvinylidene fluoride or polytetrafluoroethylene, polysulfone, polyethersulfone, silicon resin or the like, or composite membranes made of a plurality of materials among polyolefin, fluororesin, polysulfone, polyethersulfone, silicon resin and the like.

While a single material group (leaf) formed by a pair of gas-liquid contact membranes 14 and the first and second fluid passage forming members 13 and 15 is employed in the spiral wound type membrane element 10 of this embodiment, a plurality of material groups maybe employed. Pressure loss on the second fluid passage (e.g., a liquid passage) side can be suppressed low by winding the plurality of material groups around the outer peripheral surface of the second fluid supply pipe 11 and using the same. Thus, such advantages result that a low-pressure pump can be used as a pump for liquid supply and the container of the spiral wound type membrane module may not thereby be brought into a pressure-resistant structure.

Polyurethane resin or epoxy resin is employed as the resin agent 17 sealing both end portions of the second fluid passage 18 and the resin agent 16 sealing one end portion of the second fluid supply pipe 11.

Thus, in the gas-liquid contact portion 10a of the spiral wound type membrane element 10, the second fluid passage 18 is spirally formed around the second fluid supply pipe 11, and further communicates with the second fluid outlet 7. Thus, the second fluid flows without stay inside the cylindrical container 2. Therefore, occurrence of such a problem is prevented that a stay portion of treated liquid is formed between the membrane element and the cylindrical container and fine grains or TOC (total organic carbon) increases over a long period in this stay portion to cause reduction of the liquid quality likewise the conventional general spiral wound type membrane module.

The aforementioned spiral wound type membrane module 1 can be employed for gas dissolution dissolving target gas in liquid or gas adsorption for purifying flue gas or the like. As fluid (liquid) employed on a liquid phase side, which is not particularly restricted, a large one having a contact angle of at least 90° with respect to the membrane material for the gas-liquid contact membranes 14 is employed, and water, an aqueous solution of organic matter, an aqueous solution of inorganic matter, a water dispersing element, body fluid or the like is employed, for example. As fluid (gas) employed on a gas phase side, which is not particularly restricted, air, oxygen, ozone, nitrogen, carbon monoxide, carbonic acid gas, hydrogen, ammonia, hydrogen sulfide, $SO_x$ (sulfur oxide), mercaptan, halogen, hydrogen halide, lower alcohol, lower hydrocarbon, hydrocarbon halide or a mixture thereof is employed, for example.

When performing gas dissolution, liquid is supplied from the second fluid inlet 11a, and gas is supplied from the first fluid inlet 4. The liquid in which the gas is dissolved in the gas-liquid contact portion 10a is taken out from the second fluid outlet 7, and the residual gas is taken out from the first fluid outlet 6.

A use method reverse to the above is also available. In other words, gas (gas) is supplied from the second fluid inlet 11a, and liquid is supplied from the first fluid inlet 4. It is also possible to discharge the residual gas from the second fluid outlet 7 and take out the gas dissolved liquid from the first fluid outlet 6.

When performing gas discharge, either the first fluid inlet 4 or the first fluid outlet 6 is closed and the other one is connected to a vacuum pump for decompressing the inner part of the gas passage (the first fluid passage 19). In this state, the treated liquid is supplied from the second fluid inlet 11a, and taken out from the second fluid outlet 7. Thus, a gas component in the treated liquid is discharged toward the decompressed gas passage (the first fluid passage 19) side in the gas-liquid contact portion 10a.

A reverse use method is also available. In other words, either one of the second fluid inlet 11a and the second fluid outlet 7 is closed, the other one is connected with a vacuum pump for decompressing the second fluid passage 18, and treated liquid is supplied from the first fluid inlet 4 and taken out from the first fluid outlet 6. Thus, degassing can be made from the treated liquid.

EXAMPLE 1

Flat membranes for UF (ultrafiltration) Module NTU3150-S4 by Nitto Denko Corporation were sufficiently dried, and a spiral wound type membrane module of Example 1 having the structure shown in FIG. 1 was prepared with the flat membranes. As for the module size, the diameter of the body portion is 40 mm, the length is 280 mm, and the effective membrane area is about 0.4 $m^2$.

For the purpose of comparison, hollow fiber membranes of the same material as and equivalent molecular cutoff to Example 1 were sufficiently dried for preparing a capillary module (hollow fiber membrane module) of comparative example 1 employing the same module housing as the cylindrical container 2 shown in FIG. 1. The module size is similar to Example 1. In the module housing, 2600 fibers of hollow fiber whose inner diameter and outer diameter are 0.3 mm and 0.5 mm respectively are stored, and the effective membrane area thereof is about 0.6 $m^2$.

As to each of the spiral wound type membrane module of Example 1 and the capillary module of comparative example 1, service water deoxidized by $N_2$ (nitrogen) bubbling so that the oxygen concentration was not more than 0.1 ppm was supplied from each fluid inlet at 1 L/min., air was supplied from each gas inlet at 10 L/min., and the dissolved oxygen concentration of the water derived from the liquid outlet of each module was measured.

As a result, the dissolved oxygen concentration was high at 4.9 ppm in the spiral wound type membrane module of Example 1, while the dissolved oxygen concentration was low at 3.7 ppm in the capillary module of comparative example 1. From this result, the amount of dissolution of oxygen is larger in the spiral wound type membrane module of Example 1 inferior in effective membrane area, whereby it has been proved that the gas dissolution efficiency of the spiral wound type membrane module of Example 1 is high.

EXAMPLE 2

A dummy module of Example 2 was prepared by employing transparent polyethylene sheets in place of the gas-liquid contact membranes 14 in the spiral wound type membrane module shown in FIG. 1. Service water was supplied from the liquid inlet of this module at 0.5 to 5 L/min., and a dye solution was mixed into the service water by a small amount for visually observing the flow state of the service water. As a result, no abnormal stay portion where the service water stays was confirmed in the module.

In the spiral wound type membrane module according to the present invention, as hereinabove described, the gas moving speed per unit membrane area is higher as compared with the conventional hollow fiber membrane module, and an efficient gas-liquid contact operation can be performed.

According to the spiral wound type membrane module of the present invention, further, no abnormal stay portion in the clearance between the cylindrical container and the membrane element caused in the conventional spiral wound type membrane module takes place but the treatment can be performed regularly in a clean state.

Second Embodiment

A second embodiment of the spiral wound type membrane module according to the present invention is now described. The structure of the spiral wound type membrane module according to the second embodiment is similar to the structure of the spiral wound type membrane module according to the first embodiment shown in FIG. 1 to FIG. 4, except the following points:

In the sealed portions 10b and 10c of FIG. 4, both end portions of the second fluid passage 18 formed between the as-liquid contact membranes 14 holding the second fluid passage forming member 15 and both end portions of the space 18a inside the cylindrical container 2 are sealed by employing an adhesive formed by a sheet or a film of fusible fluororesin having a lower melting point than the membrane material for the gas-liquid contact membranes 14 as the resin agent 17 and heating the resin agent 17 in excess of the melting point and welding the same. As the aforementioned adhesive, fusible fluororesin such as TFA (tetrafluoroethylene-perfluoroalkyl vinyl ether copolymer) or FEP (tetrafluoroethylene-hexafluoropropylene copolymer), for example. Both end portions of the first fluid passage 19 formed between the gas-liquid contact membranes 14 holding the first fluid passage forming member 13 are opened.

The spiral wound type membrane module of this embodiment is preferably employed for gas dissolution or gas discharge by a gas-liquid contact method. In this regard, porous membranes made of PTFE (polytetrafluoroethylene) having high hydrophobicity are employed as the gas-liquid contact membranes 14. The PTFE porous membranes are formed by uniaxially orienting or biaxially orienting PTFE sheets, and the diameter of each hole of the porous membranes is preferably 0.01 to 0.2 μm. When employing porous membranes, the adhesive employed for sealing the side portions on the inner peripheral sides and the side portions on the outer peripheral sides of the gas-liquid contact membranes 14 as well as the sealed portions 10b and 10c readily impregnates the porous membranes in adhesion, whereby bonding force is improved.

Thus, also in the gas-liquid contact portion 10a of the spiral wound type membrane element 10 of this embodiment, the second fluid passage 18 is spirally formed around the second fluid supply pipe 11, and further communicates with the second fluid outlet 7. Thus, the second fluid flows without stay inside the cylindrical container 2. Therefore, occurrence of such a problem is prevented that a stay portion of treated liquid is formed in the clearance between the membrane element and the cylindrical container and fine grains or TOC (total organic carbon) increases over a long period in this stay portion to cause reduction of the liquid quality likewise the conventional general spiral wound type membrane module.

Further, the gas-liquid contact membranes 14 are formed by PTFE porous membranes having high hydrophobicity. Also when liquid containing a solvent such as alcohol is introduced into the spiral wound type membrane module, therefore, the surfaces of the gas-liquid contact membranes 14 coming into contact with the liquid is prevented from hydrophilization. Thus, reduction of gas dissolution efficiency or reduction of degassing efficiency resulting from hydrophilization of the membrane surfaces can be prevented.

While a single material group (leaf) formed by a pair of gas-liquid contact membranes 14 and the first and second fluid passage forming members 13 and 15 is employed also in the spiral wound type membrane element 10 of this embodiment, a plurality of material groups may be employed. Pressure loss on the second fluid passage (e.g., liquid) side can be suppressed low by winding the plurality of material groups around the outer peripheral surface of the second fluid supply pipe 11 and using the same. Thus, such advantages result that a low-pressure pump can be used as a pump for liquid supply and the container of the spiral wound type membrane module may not thereby be brought into a pressure-resistant structure.

The aforementioned spiral wound type membrane module can be employed for gas dissolution dissolving target gas in liquid or gas adsorption for purifying flue gas or the like. As fluid (liquid) employed on a liquid phase side, which is not particularly restricted, a large one having a contact angle of at least 90° with respect to PTFE which is the membrane material for the gas-liquid contact membranes 14 is employed, and water, an aqueous solution of organic matter, an aqueous solution of inorganic matter, a water dispersing element, body fluid or the like is employed, for example. As fluid (gas) employed on a gas phase side, which is not particularly restricted, air, oxygen, ozone, nitrogen, carbon monoxide, carbonic acid gas, hydrogen, ammonia, hydrogen sulfide, $SO_x$ (sulfur oxide), mercaptan, halogen, hydrogen halide, lower alcohol, lower hydrocarbon, hydrocarbon halide or a mixture thereof is employed, for example.

The use method for the spiral wound type membrane module according to the second embodiment is similar to the use method for the spiral wound type membrane module according to the first embodiment.

EXAMPLE 3

PTFE porous membranes NTF-1122 by Nitto Denko Corporation were employed for preparing a spiral wound type membrane module of Example 3 having the structure of the aforementioned second embodiment. As for the module size, the diameter of the body portion is 80 mm, the length is 310 mm, and the effective membrane area is about 0.4 m².

Pure water was supplied from the first fluid inlet of this spiral wound type membrane module of Example 3 and ozone gas was supplied from the second fluid inlet, for preparing ozone water under the following conditions:

Experimental Conditions

Pure Water Supply Pressure: 50 kPa

Pure Water Flow Rate: 2 L/min.

Pure Water Temperature: 25° C.

Ozone Gas Concentration: 10 vol. %

Ozone Gas Flow Rate: 3 L/min.

Ozone Gas Pressure: 1 kPa

As a result of the aforementioned experiment, it was possible to obtain ozone water having ozone concentration of 11.6 ppm.

The aforementioned result was compared with performance data of a hollow fiber membrane module of comparative example 2 employing PTFE membranes having equivalent pore diameters as the porous membranes of Example 3. As for the module size of the hollow fiber membrane module of comparative example 2, the diameter of the body portion is 110 mm, the length is 770 mm, and the effective membrane area is 2 to 3 m². According to the performance data, ozone water having ozone concentration of 10.8 ppm is obtained when preparing ozone water with the hollow fiber membrane module of comparative example 2 under the same conditions as the aforementioned experiment.

From the above comparison result, it has been proved that the gas dissolution efficiency per unit membrane area or per unit volume of the spiral wound type membrane module according to Example 3 is higher as compared with the hollow fiber membrane module of comparative example.

EXAMPLE 4

A dummy module of Example 4 was prepared by employing transparent polyethylene sheets in place of the gas-liquid contact membranes 14 in a spiral wound type membrane module having the structure of the aforementioned second embodiment. Service water was supplied from the liquid inlet of this module at 0.5 to 5 L/min., and a dye solution was mixed into the service water by a small amount for visually observing the flow state of the service water. As a result, no abnormal stay portion where the service water stays was confirmed in the module.

As hereinabove described, the spiral wound type membrane module according to the present invention has a higher gas moving speed per unit membrane area as compared with the conventional hollow fiber membrane module, and can perform an efficient gas-liquid contact operation.

According to the spiral wound type membrane module of the present invention, further, no abnormal stay portion in the clearance between the cylindrical container and the membrane element resulting in the conventional spiral wound type membrane module is caused but the treatment can be performed regularly in a clean state.

As hereinabove described, the spiral wound type membrane module and the spiral wound type membrane element employed therefor according to the present invention can be preferably employed for gas dissolution for dissolving target gas in liquid, gas adsorption for purifying flue gas, gas discharge for diffusing target gas from liquid and the like.

What is claimed is:

1. A running method of a spiral wound membrane element comprising a perforated hollow pipe and one or a plurality of pairs of continuous or independent permeation membranes spirally wound on the outer peripheral surface of said perforated hollow pipe while holding a first passage forming member inside and superimposing a second passage forming member outside, wherein a first passage is formed by said first passage forming member between said permeation membranes and a second passage is formed by said second passage forming member between said permeation membranes, and a side portion on the inner peripheral side and a side portion on the outer peripheral side of said first passage are sealed and both end portions of said first passage are opened while a side portion on the inner peripheral side and a side portion on the outer peripheral side of said second passage are opened and both end portions of said second passage are sealed, supplying first fluid into said first passage from one end portion of said spiral wound membrane element while deriving first fluid from another end portion of said spiral wound membrane element; and supplying second fluid into said second passage through the inner part of said perforated hollow part from at least one end portion of said perforated hollow pipe while deriving second fluid from the outer peripheral portion of said spiral wound membrane element.

2. The running method for a spiral wound membrane element in accordance with claim 1, wherein said first fluid is gas, and said second fluid is liquid.

3. The running method in accordance with claim 1, wherein said first fluid is liquid, and said second fluid is gas.

4. A spiral wound membrane module comprising:

a spiral wound membrane element including a perforated hollow pipe and one or a plurality of pairs of continuous or independent permeation membranes spirally wound on the outer peripheral surface of said perforated hollow pipe while holding a first passage forming member inside and superimposing a second passage forming member outside; and a cylindrical container accommodating said spiral wound membrane element and having first fluid ports on both end portions respectively and having second fluid ports on at least one end portion and the outer peripheral portion respectively, wherein a first passage is formed by said first passage forming member between said permeation membranes, and a second passage is formed by said second passage forming member between said permeation membranes, a side portion on the inner peripheral side and a side portion on the outer peripheral side of said first passage are sealed and both end portions of said first passage are opened while a side portion on the inner peripheral side and a side portion on the outer peripheral side of said second passage are opened and both end portions of said second passage are sealed, first spaces are formed in said cylindrical container on both end portion sides of said spiral wound type membrane element respectively, a second space is formed in said cylindrical container on the outer peripheral portion side of said spiral wound membrane element, and said first spaces and said second space are separated, and said first spaces communicate with said first fluid ports, said second space communicates with said second fluid port on the outer peripheral portion of said cylindrical container, and the inner part of said perforated hollow pipe communicates with said second fluid port on at least one end portion of said cylindrical container.

5. The spiral wound membrane module in accordance with claim 4, wherein fluid passing through said first passage is gas, and fluid passing through said second passage is liquid.

6. The spiral wound membrane module in accordance with claim 4, wherein fluid passing through said first passage is liquid, and fluid passing through said second passage is gas.

7. The spiral wound membrane module in accordance with claim 4, wherein said permeation membrane has a skin layer or dense layer on the membrane surface, and is so arranged that said skin layer or dense layer is on the side of the passage for liquid.

8. The spiral wound membrane module in accordance with claim 4, wherein said permeation membrane is a simple substance membrane or a composite membrane formed by one or a plurality of membranes selected from a porous membrane, a microporous membrane and a non-porous membrane.

9. The spiral wound membrane module in accordance with claim 4, wherein said permeation membrane is a hydrophobic permeation membrane.

10. The spiral wound membrane module in accordance with claim 9, wherein said hydrophobic permeation membrane is made of fluororesin.

11. The spiral wound membrane module in accordance with claim 10, wherein said fluororesin is polytetrafluoroethylene.

12. The spiral wound membrane module in accordance with claim 9, wherein said hydrophobic permeation membrane is a porous membrane.

13. The spiral wound membrane module in accordance with claim 9, wherein a side portion on the inner peripheral side and a side portion on the outer peripheral side of said first passage and both end portions of said second passage are sealed by heating and melting fluororesin having a melting point lower than the melting point of said permeation membrane.

14. A spiral wound membrane element comprising:

a perforated hollow pipe; and one or a plurality of pairs of continuous or independent permeation membranes spirally wound on the outer peripheral surface of said perforated hollow pipe while holding a first passage forming member inside and superimposing a second passage forming member outside, wherein a first passage is formed by said first passage forming member between said permeation membranes, and a second passage is formed by said second passage forming member between said permeation membranes, and a side portion on the inner peripheral side and a side portion on the outer peripheral side of said first passage are sealed and both end portions of said first passage are opened while a side portion on the inner peripheral side and a side portion on the outer peripheral side of said second passage are opened and both end portions of said second passage are sealed.

15. The spiral wound membrane element in accordance with claim 14, wherein fluid passing through said first passage is gas, and fluid passing through said second passage is liquid.

16. The spiral wound membrane element in accordance with claim 14, wherein fluid passing through said first passage is liquid, and fluid passing through said second passage is gas.

17. The spiral wound membrane element in accordance with claim 14, wherein said permeation membrane has a skin layer or dense layer on the membrane surface, and is so arranged that said skin layer or dense layer is on the side of the passage for liquid.

18. The spiral wound membrane element in accordance with claim 14, wherein said permeation membrane is a simple substance membrane or a composite membrane formed by one or a plurality of membranes selected from a porous membrane, a microporous membrane and a non-porous membrane.

19. The spiral wound membrane element in accordance with claim 14, wherein said permeation membrane is a hydrophobic permeation membrane.

20. The spiral wound membrane element in accordance with claim 19, wherein said hydrophobic permeation membrane is made of fluororesin.

21. The spiral wound membrane element in accordance with claim 19, wherein a side portion on the inner peripheral side and a side portion on the outer peripheral side of said first passage and both end portions of said second passage are sealed by heating and melting fluororesin having a melting point lower than the melting point of said permeation membrane.

* * * * *